March 17, 1931. A. P. SNYDER 1,797,028
ELECTRIC MOTOR DRIVEN REVOLVING SHEARS
Filed June 6, 1930
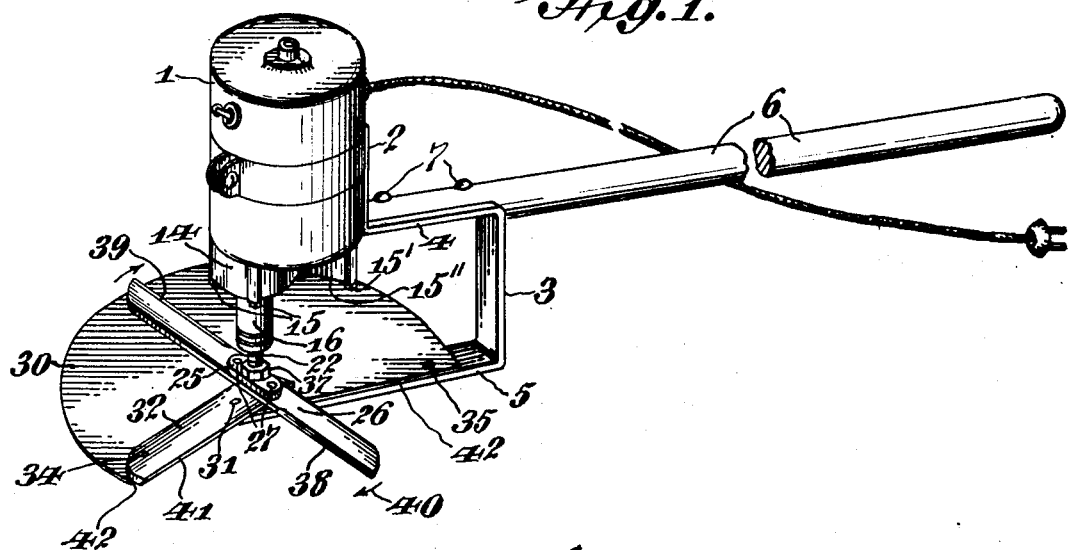
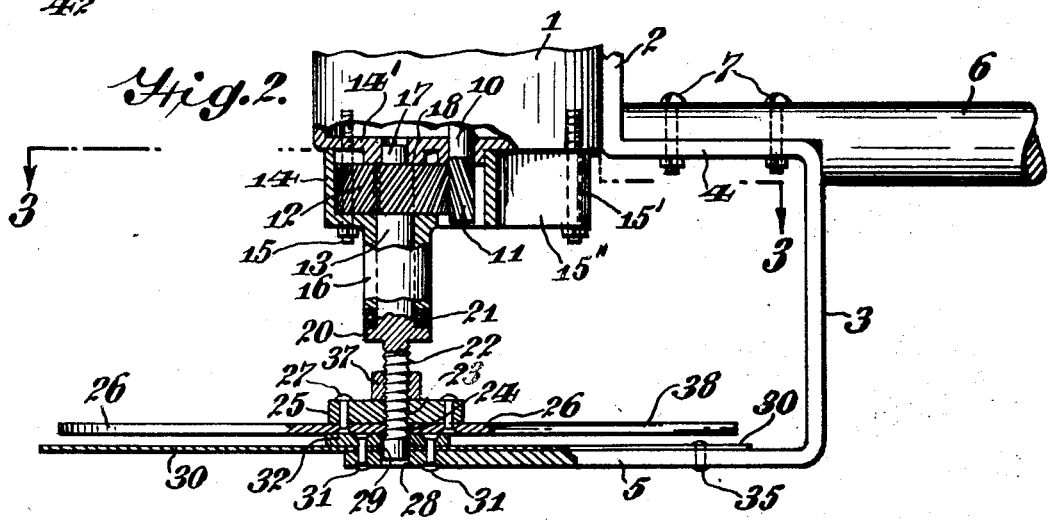
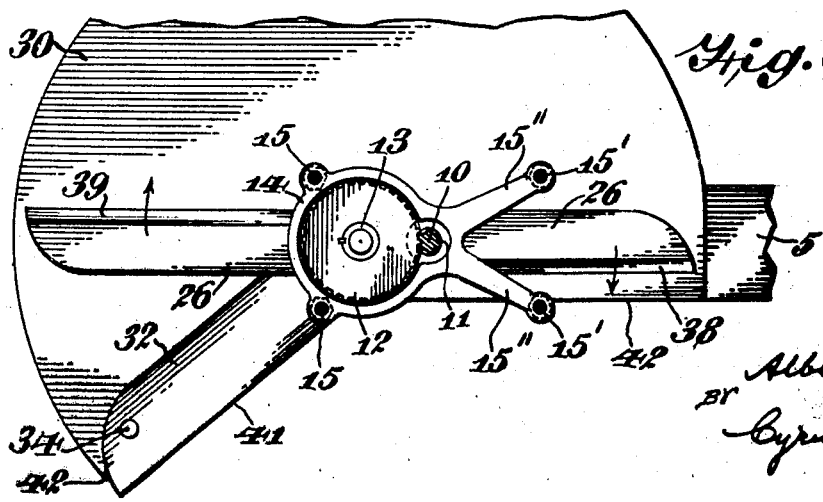

Patented Mar. 17, 1931

1,797,028

UNITED STATES PATENT OFFICE

ALBERT P. SNYDER, OF FRANKLINVILLE, NEW JERSEY

ELECTRIC-MOTOR-DRIVEN REVOLVING SHEARS

Application filed June 6, 1930. Serial No. 459,540.

My invention relates to electric motor driven revolving shears which are adapted for use in the trimming of hedges and the like.

The general object of the invention is to provide electric motor driven revolving shears which are of novel and of extremely simple construction and which may be manufactured at a minimum of expense.

It also is an object of the invention to provide electric motor driven revolving shears of rugged construction, the co-operating shearing portions of which being of a character such that they are unlikely to become bent or distorted to thereby prevent efficient operation.

Other objects and advantages of the invention will be pointed out in the detailed description thereof which follows or will be apparent from such description.

In order that the invention may be readily understood and its practical advantages rendered more apparent reference should be had to the accompanying drawing wherein I have illustrated one embodiment of electric motor driven revolving shears embodying my invention. However, it is to be understood that the invention may be embodied in other forms of construction than that shown and that changes in the details of construction may be made within the scope of the claims without departing from the said invention.

In the drawing:

Fig. 1 is a view in perspective of electric motor driven revolving shears embodying the invention;

Fig. 2 is a view partly in side elevation and partly in vertical section; and

Fig. 3 is a horizontal sectional view taken along the line 3—3 of Fig. 2.

In the drawing I have shown an electric motor 1 of any known suitable construction and weight which is mounted upon an upwardly projecting portion 2 of an angular frame member 3 having parallel horizontally extending portions 4 and 5. The portion 2 projects upwardly from the portion 4. A handle 6 is connected to the latter portion by means of fastening bolts 7. The motor shaft 10 is provided at its lower end with a spiral gear 11 which is in engagement with a substantially larger spiral gear 12 mounted upon and secured to the upper or inner end of a shaft 13 which is supported in parallel relation to the motor shaft 10. The gear 12 is located within a casing 14 secured upon the adjoining end plate 14' of the casing of the motor 1 by means of fastening bolts 15 and 15', the latter engaging the outer ends of arms 15" which project from the said casing 14. The casing 14 is provided with a tubular boss or projection 16 within which the shaft 13 is journaled. The upper or inner end of the shaft is provided with a reduced projecting portion 17 which is journaled in an opening provided in a boss 18 which projects from the end plate 14' of the motor casing.

The shaft 13 is provided with a lateral circular flange 20 which is located in spaced relation to the lower or outer end of the tubular boss or projection 16 and ball-bearings 21 are interposed between the said flange and the end of the said tubular boss or projection so as to reduce the friction and facilitate the rotation of the said shaft. The lower end portion of the said shaft is reduced and provided with screw-threads as shown at 22 and is in screw-threaded engagement with tapped openings 23 and 24 provided in a block 25 and a blade or bar 26. The latter is secured by rivets 27 to the block 25 which may be regarded as a carrier for the said bar. The lower or outer end of the reduced portion 22, which preferably is not screw-threaded, projects beyond the lower side of the bar 26 and engages registered openings 28 and 29 provided in the horizontal portion 5 of the frame 3 and in a plate 30 secured by rivets 31 to the said part 5. The said rivets also constitute means for securing the inner end portion of a blade or bar 32 to the part 5 and to the said plate 30. The lower end of the reduced portion 22 of the shaft 13 extends through an opening provided in the inner end of the bar 32 and the said bar extends radially with respect to the axis of the said shaft 13. The outer end portion of the said bar 32 is secured by means of a rivet 34.

In addition to being secured to the part 5 of the frame 3 by rivets 31 the plate 30 is further secured to the said part by means of a rivet 35 which engages the said plate 30 at a point near its periphery. The shearing or trimming means is of a character such that it operates in the manner of scissors or shears. It may be noted that when the bar 26 has been adjusted to the position desired upon the portion 22 of the shaft 13 by rotating the same together with the part 25 it is then locked in position by means of a lock nut 37 in known manner. One edge of each of the opposite end portions of the bar 26 is beveled as shown at 38 and 39 so as to provide shearing edges. The shearing edge provided by the bevel 38 and that provided by the bevel 39 are located on opposite edges of the bar 26 as shown. The bar 26 is held in close relationship with the bar 32 so that when the said bar 26 is rotated in clockwise direction, as indicated by the arrow 40 in Fig. 1, the shearing edges thereon co-operate with a shearing edge 41 provided upon an edge of the bar 32. As already indicated, the shearing action is effected in the same manner as in the case of scissors or shears.

The tightness or closeness of the bar 26 to the bar 32 may be varied by adjusting the said bar 26 longitudinally of the reduced portion 22 of the shaft 13.

A portion of the plate 30 is cut away, as indicated at 42, so as to permit twigs, branches and the like which are to be trimmed to project beyond the plane of the said plate 30 into position to be cut off by the co-action of the cutting edges of the bar 26 with the cutting edge of the bar 32. The remaining portion of the plate 30 operates to displace twigs, branches and the like to prevent them from assuming or taking a position in the plane of movement of the end portion of the bar 26 which may be traveling thereover after it has co-operated with the cutting edge of the bar 32 and has passed beyond said bar, as indicated in Fig. 1 of the drawing. The edge of the remaining portion of the plate 30 extends beyond the outer ends of the bar 26 so that the portions of the latter which may be located over the said plate are prevented from contacting with twigs, branches or the like.

It is to be noted particularly that the bar 26 is mounted on a counter-shaft 13 provided with a large spiral gear 12 which is driven by a small spiral gear 11 upon an end of the motor shaft 10. In this way the power with which the shaft 13 and bar 26 carried thereby are driven is increased with loss of speed as compared with what the speed would be were the said bar mounted directly upon the motor shaft 10. However, the construction by means of which increased power is obtained is greatly to be preferred to that which would result from mounting the bar 26 directly upon the motor shaft 10.

Having thus described my invention, what I claim and desire to secure by Letters Patent is:

1. Motor driven revolving shears, comprising a relatively stationary blade having a shearing edge, a motor having a main shaft provided with a spiral pinion, a counter-shaft having a spiral gear thereon of substantially greater diameter than that of the spiral pinion, the latter operating to drive the said spiral gear and the said counter-shaft, a blade connected at its midpoint to the said counter-shaft, said last named blade being held in contactual relationship with the said relatively stationary blade and being provided with two shearing edges facing in opposite directions upon opposite sides of its point of connection to the said counter-shaft, the said last named shearing edges co-operating alternately with the shearing edge of the said stationary blade, and a guard attached to the stationary blade to prevent the material that is to be cut from coming into contact with the said last named blade during its idling return movement.

2. Electric motor driven revolving shears, comprising a circular member from which a portion has been removed to produce angularly related edges, a relatively stationary blade mounted upon said member having a shearing edge in proximity to and parallel with one of the said edges, means for supporting said circular member, an electric motor having a main shaft provided with a gear pinion, a counter-shaft having a gear of substantially greater diameter than the said gear pinion, said gear and counter-shaft being driven by said gear pinion, a blade mounted at its mid-point upon said counter-shaft in overlying relation to the said relatively stationary blade, and means for adjusting the said second named blade toward and from the said relatively stationary blade, and each of the portions of the said second named blade on opposite sides of its point of connection to the said shaft being provided with a shearing edge, said shearing edges facing in opposite directions whereby upon rotation of the said second named blade with the said counter-shaft the said edges co-operate alternately and frictionally with the shearing edge upon the said relatively stationary blade.

In testimony that I claim the foregoing as my invention, I have hereunto signed my name this 4th day of June, A. D. 1930.

ALBERT P. SNYDER.